United States Patent [19]
Ikai et al.

[11] Patent Number: 6,008,855
[45] Date of Patent: Dec. 28, 1999

[54] DOUBLE-SPEED IMAGE SIGNAL DISPLAY METHOD, DISPLAY UNIT AND TELEVISION RECEIVER

[75] Inventors: Akira Ikai, Ibaraki; Yoshihisa Uchida, Hirakata, both of Japan

[73] Assignee: Matsushita Electric Industrial Co., Ltd., Osaka, Japan

[21] Appl. No.: 09/067,315

[22] Filed: Apr. 27, 1998

[30] Foreign Application Priority Data

Apr. 25, 1997 [JP] Japan ................................. 9-108794

[51] Int. Cl.⁶ .................................................. H04N 7/01
[52] U.S. Cl. ......................... 348/447; 348/459; 348/910
[58] Field of Search .................................... 348/447, 910, 348/439, 440, 459, 441, 564, 563, 584, 607

[56] References Cited

U.S. PATENT DOCUMENTS

| | | | |
|---|---|---|---|
| 4,713,687 | 12/1987 | Shimizu et al. | 358/138 |
| 5,315,327 | 5/1994 | Suzuki | 348/440 |

FOREIGN PATENT DOCUMENTS

| | | |
|---|---|---|
| 29 49 020 | 12/1980 | Germany . |
| 1-143575 | 6/1989 | Japan . |
| 1-165280 | 6/1989 | Japan . |
| 3-66270 | 3/1991 | Japan . |
| 97/05598 | 2/1997 | WIPO . |

OTHER PUBLICATIONS

R. Kays, "Flimmerreduktion im Fernsehempfänger" Jan. 1, 1989, vol. 43, No. 3, pp. 119–124.
European Search Report for International Application No. 98107470.1 dated Apr. 21, 1999.

Primary Examiner—Victor R. Kostak
Attorney, Agent, or Firm—Ratner & Prestia

[57] ABSTRACT

A flickerless television receiver displays image signals having the horizontal/vertical scanning frequencies thereof increased to two times the horizontal/vertical scanning frequencies of the broadcast signals to be received. Flickerless display performance can be confirmed with a single television receiver by generating signals to extract every other field for image displaying and showing two kinds of image signals, namely double-speed image signal and extracted image signal. A display unit displays double-speed image signals having horizontal and vertical scanning frequencies of image signals increased to two times by conversion, wherein extracted image signals formed by extracting every other field or frame from screen images are generated and two kinds of images formed of the double-speed image signals and extracted image signals are simultaneously displayed on one screen.

16 Claims, 6 Drawing Sheets

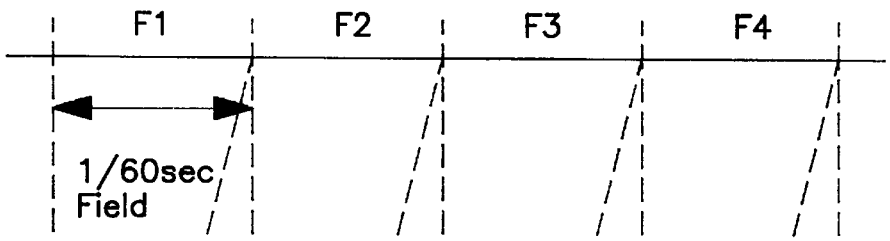
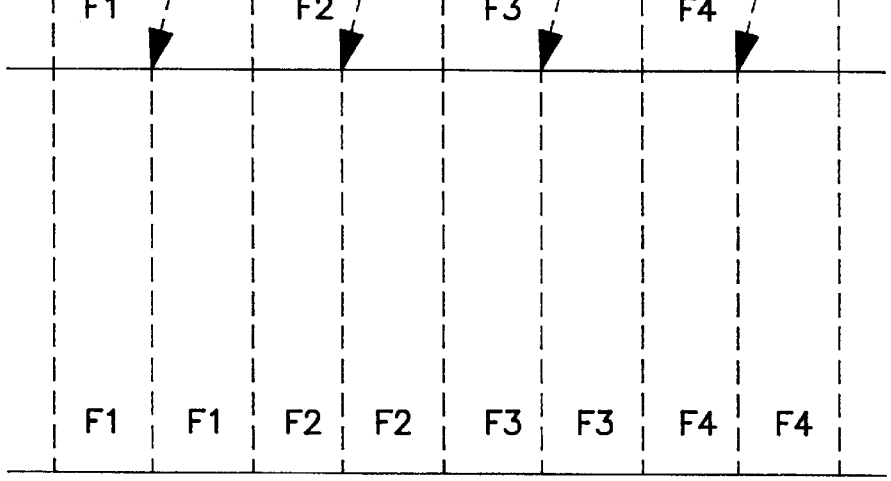

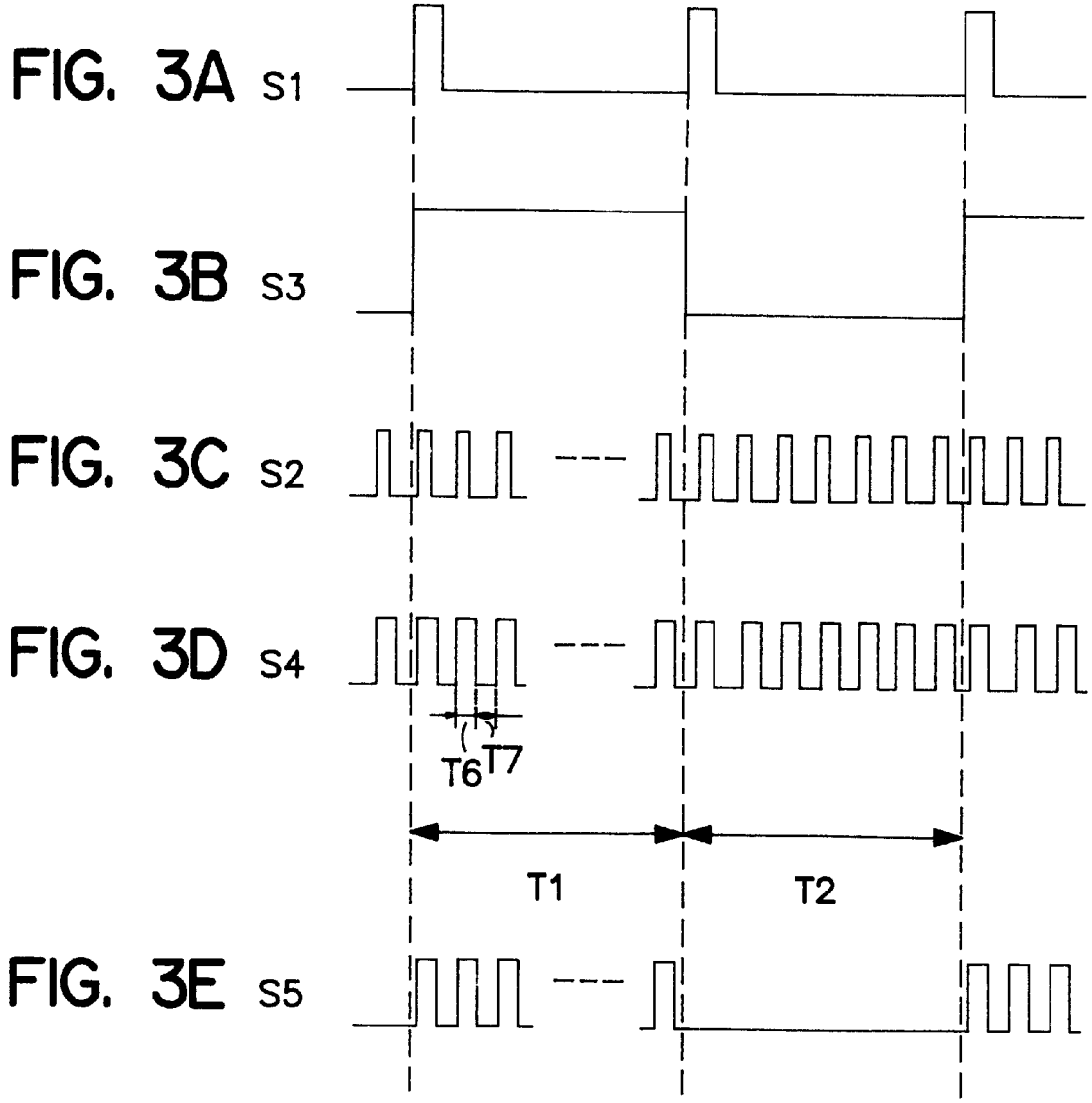

DOUBLE-SPEED IMAGE SIGNAL DISPLAY METHOD, DISPLAY UNIT AND TELEVISION RECEIVER

FIELD OF THE INVENTION

The present invention relates to a display method, display unit, and television receiver whereby double-speed image signals and extracted image signals formed as a result of extracting every other field picture of the double-speed image signals are generated. The double-speed image and extracted image signals, are displayable on the same screen at the same time.

BACKGROUND OF THE INVENTION

Standard television signals such as NTSC, PAL for example, are usually formed of image signals to produce 60 or 50 fields per second. When the image signals of the television signal systems are displayed on a screen, there are some flickers observed on the displayed picture. So called flickerless television receivers with a provision of making the flickers less conspicuous have been on the market. In a typical conventional flickerless television receiver in FIG. 6 a tuning/detecting circuit 20 amplifies and detects the broadcasting signal. A double-speed signal generating circuit 21 converts the detected signal to image signals having the horizontal and vertical scanning frequencies thereof increased to two times the horizontal and vertical scanning frequencies of the inputted image signals. The converted image signals are referred to as double-speed image signals and the image displayed on a television receiver is referred to as double-speed image.

In the so called flickerless television receiver, the same image is displayed twice, in 1/60 sec or 1/50 sec repeatedly and then the number of fields per second is converted to 100 or 120 and vertical frequency is 100 Hz or 120 Hz, which is twice the ordinary frequency. When the double-speed image signals are displayed on the television receiver, flickers are reduced.

However, flickers of a television receiver inherently tend to be difficult to notice in certain environments. Therefore, in order to show clearly the advantages of flickerless television receivers, it would be desirable to make a direct comparison of displayed images by placing a flickerless television receiver and an ordinary television receiver side by side.

Regretfully, however, ordinary TV viewers do not have opportunities to watch a standard television receiver and a flickerless television receiver at the same time and to compare pictures displayed on respective screens to see the difference in picture quality. Rather, TV viewers usually tend to recognize the excellent picture quality or not so good picture quality just by watching the screen of a flickerless television receiver. Therefore, it is difficult for TV viewers to truly appreciate the excellent picture quality of the flickerless television receiver.

SUMMARY OF THE INVENTION

A flickerless display unit and television receiver are provided whereby double-speed image signals and extracted image signals can be displayed on the same screen at the same time. This provides viewers an opportunity to appreciate the excellent picture quality of a flickerless television receiver.

BRIEF DESCRIPTION OF THE INVENTION

FIGS. 2A to 2C are timing diagrams which illustrate the steps of generating a double-speed signal in accordance with the first exemplary embodiment of the present invention.

FIGS. 3A to 3E show waveforms which correspond to the respective blocks of FIG. 1.

DESCRIPTION OF THE PREFERRED EMBODIMENTS

First Exemplary Embodiment

A detailed explanation will be made on a television receiver in a first exemplary embodiment of the present invention with reference to FIG. 1, FIGS. 2A to 2C, FIGS. 3A to 3E, FIG. 4.

Figure 1:
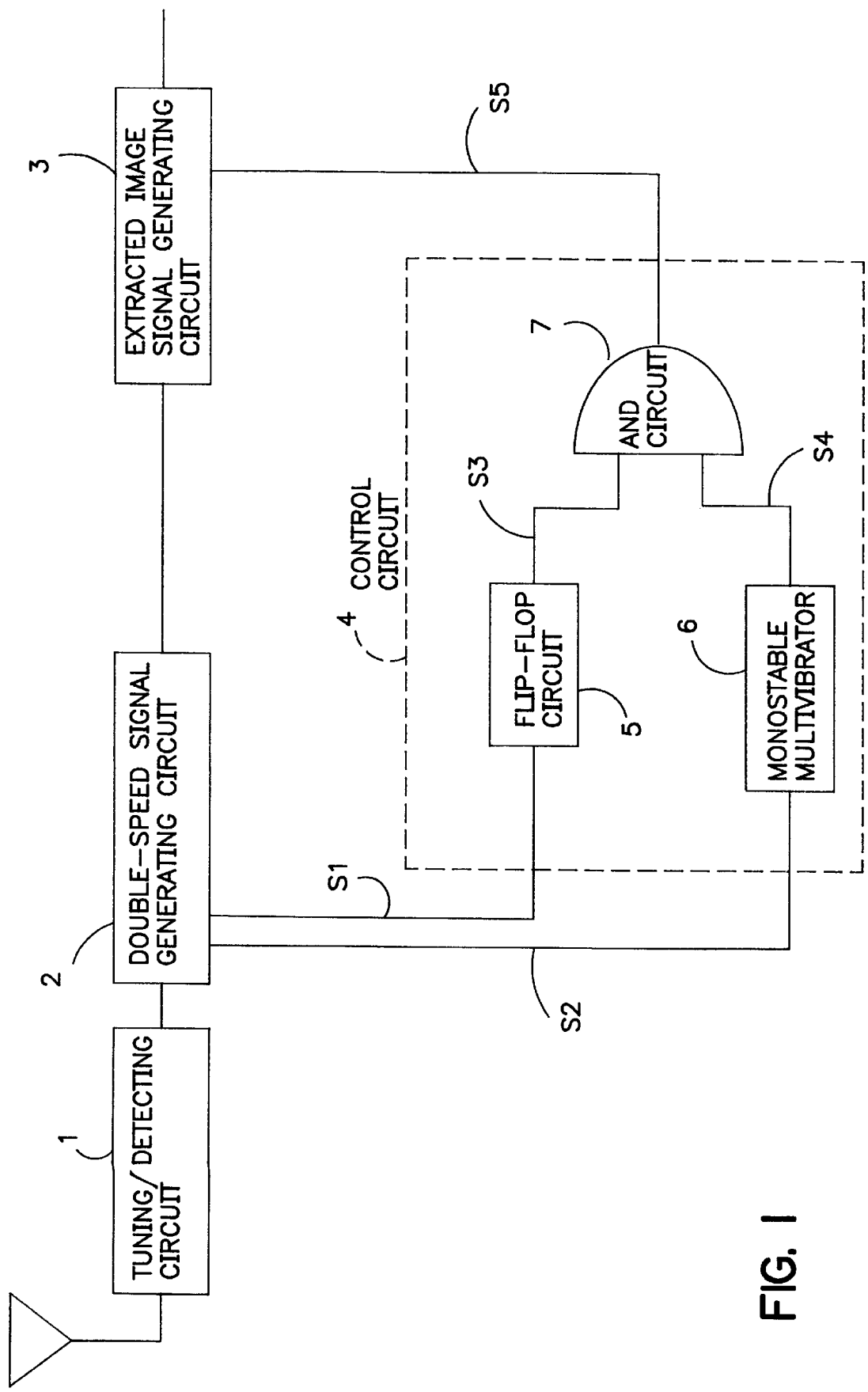
FIG. 1 is a block diagram of a television receiver in accordance with first exemplary embodiment of the present invention.

FIG. 1 is a block diagram of the television receiver in the first exemplary embodiment of the present invention. The television receiver in the first exemplary embodiment is formed of a tuning/detecting circuit 1, a double-speed signal generating circuit 2, an extracted image signal generating circuit 3 and a control circuit 4. The control circuit 4 is comprised of a flip-flop circuit 5, a monostable multivibrator 6 and an AND circuit 7.

The television receiver in the first exemplary embodiment has the extracted image signal generating circuit 3 and control circuit 4 added to a prior art flickerless television receiver.

In FIG. 1, broadcast signals are amplified and detected in the tuning/detecting circuit 1 and then outputted to the double-speed signal generating circuit 2. The double-speed signal generating circuit 2 generates a double-speed signal by converting the horizontal and vertical scanning frequency of the inputted image signal to double in frequency and compresses the image signal in time axis to half, and outputs the double-speed image signal to the extracted image signal generating circuit 3. The double-speed image signal is for displaying repeatedly the same compressed images twice in a field period of the original image signal. Vertical synchronization signal is defined as follows here. The exemplary numerals cited below are for NTSC. There are concepts of field (1/60 sec) and frame (1/30 sec) as for vertical synchronization as original image signal is ordinarily interlace signal. New field (1/120 sec) and new frame (1/60 sec) of vertical synchronization are generated by converting to the double-speed image signal. The extracted image signal generating circuit 3 outputs image signals with only a black level instead of the double-speed image signals in every other field, according to the control signal S5 outputted from the control circuit 4. In other words, the extracted image signal generating circuit 3 is a circuit for erasing every other field of the double-speed image signal inputted from the control circuit 4. The image converted to a conventional image of 60 Hz by extracting every other new field from the double-speed image and reducing the field frequency to one half of the new one field are hereafter described as an extracted image, and the image signal for displaying the extracted image is described as an extracted image signal.

Next, operation of the television receiver in the first exemplary embodiment is described using FIGS. 2A to 2C and FIGS. 3A to 3E.

The double-speed signal generating steps are explained as shown in FIGS. 2A to 2C in which the abscissa is a time axis.

FIG. 2A shows time intervals in which original image signals F1, F2, F3 and so on are displayed. FIG. 2B shows 1/N (where N is an integer) time compressed image signals F1, F2, F3 and so on. In this example, N=2 FIG. 2C shows time intervals in which double-speed image signals F1, F1, F2, F2, F3, F3 and so on are displayed. The double-speed signal generating circuit 2 compresses image signal F1 as shown in FIG. 2A in time axis to half as shown in FIG. 2B and outputs image signal F1 N (in this example, 2,) times, namely, a double-speed image signal as shown in FIG. 2C. The double-speed signal is generated in this way. The double-speed signal generating circuit 2 outputs vertical synchronizing signals S1 to the divider (e.g., flip-flop) circuit 5. The divider circuit 5 divides the frequency of the inputted vertical synchronizing signals S1 by one half and outputs the output signals S3 as shown in FIG. 3C to the AND circuit 7.

At the same time, the double-speed signal generating circuit 2 outputs the horizontal synchronizing signals S2 as shown in FIG. 3C to the monostable multivibrator 6. The monostable multivibrator 6 generates "high" pulses during half the duration of the horizontal scanning period according to the inputted horizontal synchronizing signals S2 and outputs output signals S4 as in FIG. 3D to the AND circuit 7. Each of "high" period T6 and "low" period T7 is 50% of one horizontal period. The AND circuit 7 performs an AND operation between the inputted signals S3 and S4 and outputs a logical AND as in FIG. 3E. The logical AND S5 is the control signals whereby the extracted image signals are generated in the extracted image signal generating circuit 3. Needless to say, the control signal as described above can be obtained by counting an appropriate clock signal in a counter.

The waveforms of the control signals S5 generated as described in the foregoing shows "low" throughout the vertical scanning period T2 that appears every other vertical scanning period as shown in FIG. 3E. In periods T1 where the control signals S5 do not show "low" throughout one vertical scanning period, the control signals S5 consists of the image erasing duration T6 with "high" and the normal image displaying duration T7 with "low". Accordingly, in each respective period T1 where the control signals S5 do not show "low" throughout one vertical scanning period, half period of one horizontal scanning period are "high" and the remaining period are "low".

The inputted double-speed image signals are passed through the extracted image signal generating circuit 3 as they are during the normal image displaying duration T2 and vertical scanning period T7 where the control signals 5 show "low". The extracted image signal generating circuit 3 erases the inputted double-speed image signals and outputs black level image signals during the image erasing duration T6 where the control signals S5 show "high". The control signals S5 are inputted to the extracted image signal generating circuit 3.

Double-speed image signals are erased in the extracted image signal generating circuit 3 during the periods where the control signals S5 shows "high". In FIG. 3D, the periods where the output signals S4 from the monostable multivibrator 6 show "high" are indicated by the image erasing duration T6.

Figure 4:
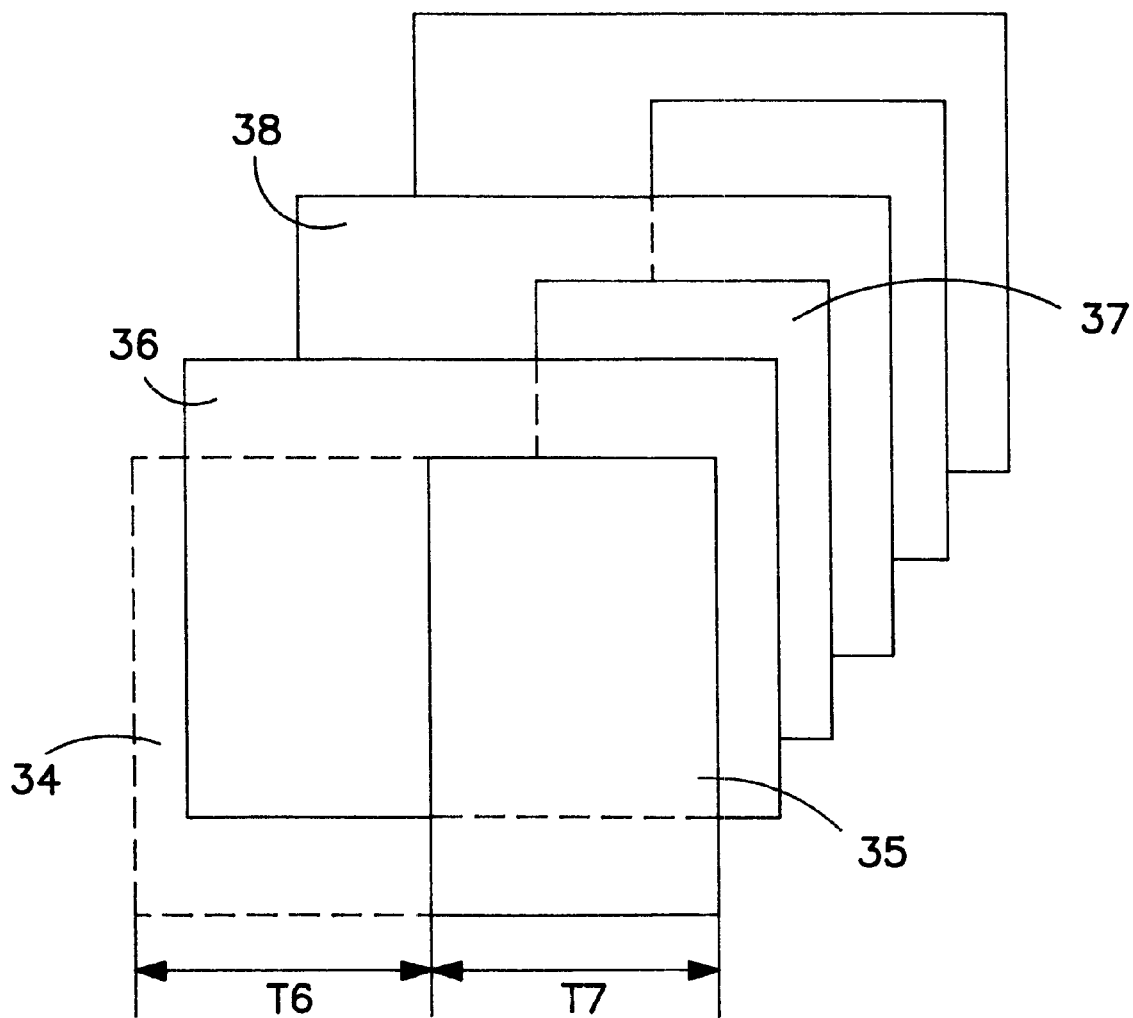
FIG. 4 shows the screen of each respective field in the first exemplary embodiment of the present invention.

FIG. 4 shows images in a television receiver. In FIG. 4, X-axis and Y-axis shows horizontal and vertical direction of a displayed images respectively and T-axis shows time axis direction corresponding to a displaying sequence.

Image A1 and image A2 are the same image displayed twice repeatedly by double-speed conversion. An area 34 indicated by broken lines shows the area, where half of images A1 have been erased by functioning of the extracted image signal generating circuit 3, corresponding to the image erasing duration T6 as shown in FIG. 3D. An area 35 indicated by solid lines shows the area corresponding to the normal image displaying duration T7 as shown in FIG. 3D, where double-speed images are displayed in a television receiver.

Thus, images are erased during one half of the horizontal scanning period and displayed during the rest of the period for every other field. In FIG. 4 images B1 and B2, images C1 and C2 are each the same image displayed twice repeatedly by double-speed conversion. The image in area 37 in FIG. 4 has images erased during one half of the horizontal scanning period and displayed during the remaining half of the period as the image in area 35. Fields 36 and 38 are the fields where images are not erased and the whole images are displayed.

As described in the above, according to the present invention the same image is displayed twice repeatedly and 100 or 120 images are displayed in (for example) one half area of the display of television receiver and 50 or 60 images are displayed in (for example) another half area of the display by erasing images corresponding to one half period of one horizontal scanning periods of vertical scanning frequency converted to double for every other frame. Thus, without any change to deflection circuits for pseudo 60 Hz vertical scanning frequency, the same image screen displays both the double-speed image and the extracted image. The same explanation as above can be applied if the field cycle period is 1/50 sec in case of PAL/SECAM format.

The control circuit 4 can be realized (for example) by hardware and software using a microcomputer.

The same effect is obtained if the double-speed image signal is a signal of repetition numbers of N (N is an integer) and the extracted signal is a signal of repetition numbers decreasing at least one from that of the N times-speed image signal.

Second Exemplary Embodiment

Figure 5:
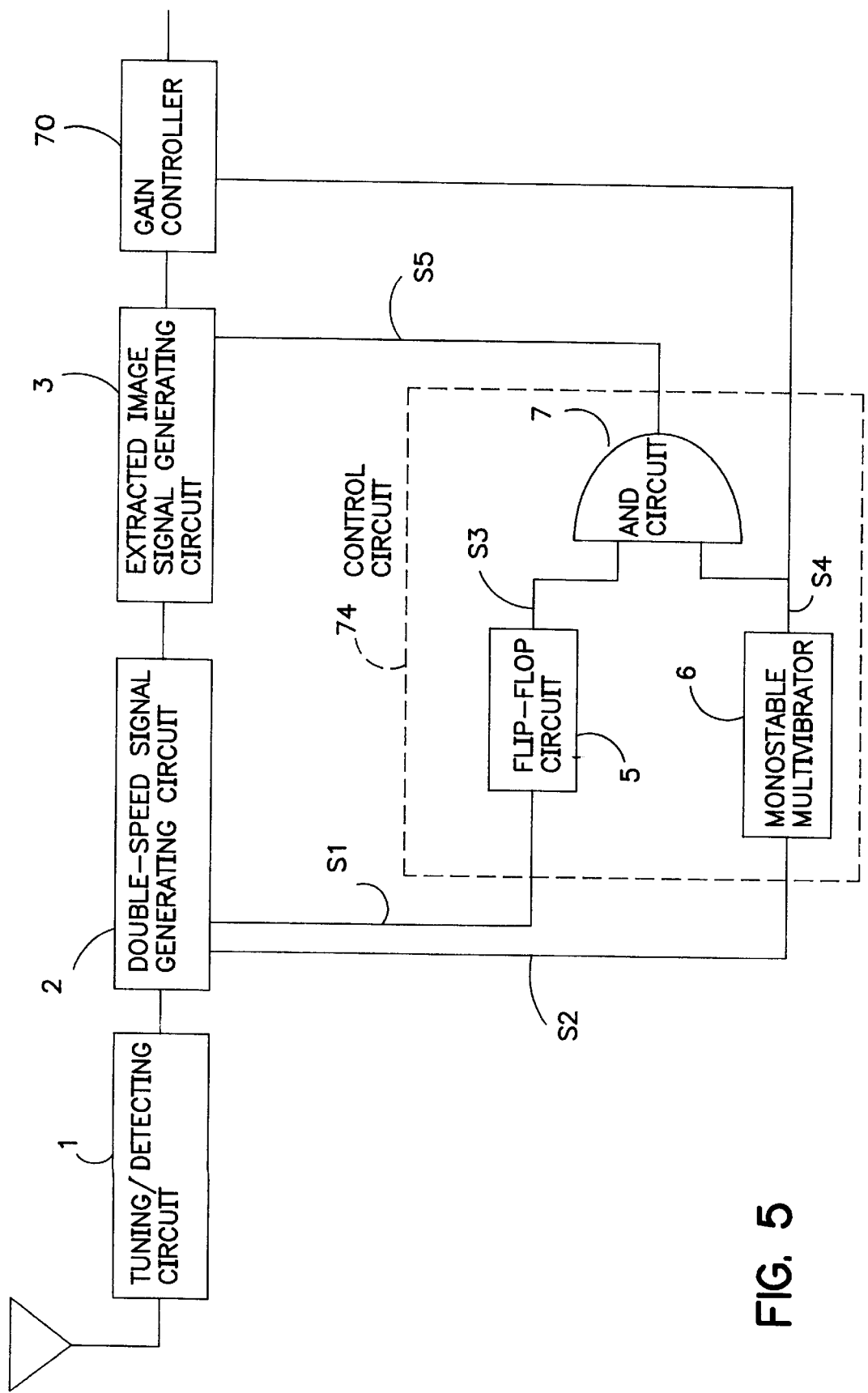
FIG. 5 is a block diagram of a television receiver in a second exemplary embodiment of the present invention.
Figure 6:
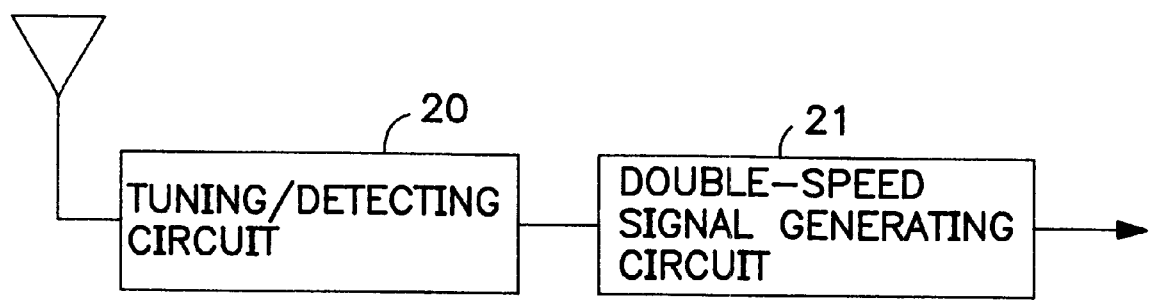
FIG. 6 is a block diagram of a prior art flickerless television receiver.

FIG. 5 is a block diagram of a television receiver in a second exemplary embodiment of the present invention. A detail that differs from the first exemplary embodiment is that the television receiver further comprises a gain controller 70 inputting the output signal of the extracted image signal generating circuit 3, and a control circuit 74 outputs the output signal S4 of a monostable multivibrator 6 to the gain controller 70. The other configurations and operations of the present embodiment is the same as in the first exemplary embodiment, and thus their explanation is omitted.

As described in the first exemplary embodiment the image display number of times in a double-speed image display area is twice as much as times comparing to that in a extracted image display area. Therefore average luminance is higher in the double-speed image display area than in the extracted image display area in the display.

The luminance in the double-speed image area and the extracted image area is adjusted to be at the same level by adjusting a gain in the gain controller 70 for the luminance of the displayed image. The control circuit 74 outputs a control signal S4 having display time T6 and T7 in FIG. 4 corresponding to the double-speed image area and the extracted image area, to the gain controller 70. The control circuit 74 differs from the control circuit 4 in the point that the control circuit 74 outputs the signal S4 to the gain controller 70. The other configurations and operations of both control circuits are the same.

In this exemplary embodiment the extracted image is displayed in the period T6 and the double-speed image is displayed in the period T7 as in FIG. 4. The luminance of both images become almost the same if the gain in the period T6 is adjusted 20 to 30% lower than the gain in the period t7 in the gain controller 70. As described above, a the television receiver can display images corresponding to both double-speed image signals and extracted image signals simultaneously on one and the same screen, thereby allowing general viewers to notice that images can be improved by means of the flickerless provisions.

Although every other field of one part of the displayed images has been extracted in the foregoing exemplary embodiments while maintaining the concept of field and interlace, it is needless to say that the same effects can be gained by extracting every other frame of one part of the displayed images in a double-speed conversion system treating frame only converting interlace to no-interlace. Even when every other frame of screen images is extracted, images of both double-speed image signals and extracted image signals can be displayed on the same screen according to the same method as described above.

Each of the image erasing duration T6 and the normal image displaying duration T7 can be other than 50% as described in the forgoing.

Furthermore, although detailed descriptions have been made on television receivers in the foregoing, the present invention can be applied equally well to products other than television receivers as a matter of course since flickerless performance is desired of other display equipment such as a monitors for personal computer and the like. Thus, the present invention may be being embodied in a variety of other products other than the ones exemplified in the foregoing. Therefore, any other modified examples within the spirit and scope of the present invention are all to be covered by what is claimed by the present invention.

What is claimed is:

1. A method of processing an image signal, said method comprising the steps of:
   time compressing said image signal by a factor N;
   repeating the time compressed image signal N times to obtain an N times speed image signal;
   removing at least one frame for every N frames of said time compressed signal to obtain an extracted image signal;
   displaying simultaneously an N times-speed image and an extracted image, the N times-speed image corresponding to the N times-speed image signal and the extracted image corresponding to the extracted image signal.

2. A method of processing an image signal according to claim 1, wherein said one display is a television receiver.

3. A display unit, comprising:
   means for the compressing an image signal by a factor N;
   N-times speed image signal generating means for repeating the time compressed image signal N times to obtain an N times-speed image signal;
   extracted image signal generating means for removing at least one frame for every N frames of said time compressed signal to obtain an extracted image signal; and
   control means for generating a control signal for said extracted image signal generating means to generate said extracted image signal.

4. A display unit according to claim 3, wherein said display unit is included in a television receiver.

5. A display unit according to claim 3, wherein said extracted image signal generating means is further for generating black level image signals responsive to the control signal generated by said control means.

6. A display unit according to claim 5, wherein said display unit is included in a television receiver.

7. A display unit according to claim 5, wherein said control means includes:
   a divider circuit for inputting vertical synchronizing signals from said N times-speed image signal generating means and outputting an output signal having said compressed cycle;
   a monostable multivibrator for inputting the horizontal synchronizing signals from said N times-speed image signal generating means and generating an output signal having a specified pulse width;
   and an AND circuit to obtain logical AND between the output signal of said divider circuit and the output signal of said monostable multivibrator.

8. A display unit according to claim 7 wherein said display unit is included in a television receiver.

9. A display unit according to claim 4, wherein said control means includes:
   first pulse outputting means for outputting pulses, each having a specified pulse width, within the duration of the horizontal synchronization period in synchronization with a horizontal synchronizing signal outputted from said N times-speed image signal generating means;
   second pulse outputting means for outputting pulses for every other field or frame in synchronization with a vertical synchronizing signal outputted from said N times-speed image signal generating means; and
   logical AND operation means for performing a logical AND operation between pulses outputted from said first pulse outputting means and said second pulse outputting means.

10. A display unit according to claim 9, wherein said display unit in included in a television receiver.

11. A display unit according to claim 3 further comprising gain control means for adjusting at least one of a) said N times-speed image signal and b) said extracted image signal.

12. A display unit according to claim 11, wherein said display unit is included in a television receiver.

13. A display unit according to claim 11, wherein said gain control means adjusts the luminance of an image corresponding to the N times-speed image signal and an image corresponding to said extracted signal.

14. A display unit according to claim 13, wherein said display unit is included in a television receiver.

15. A method of processing an image signal according to claim 1, wherein in said step of removing at least one frame, N−1 frames for every N frames are removed.

16. A display unit according to claim 3, wherein said extracted image signal generating means removes N−1 frames for every N frames.

* * * * *